UNITED STATES PATENT OFFICE.

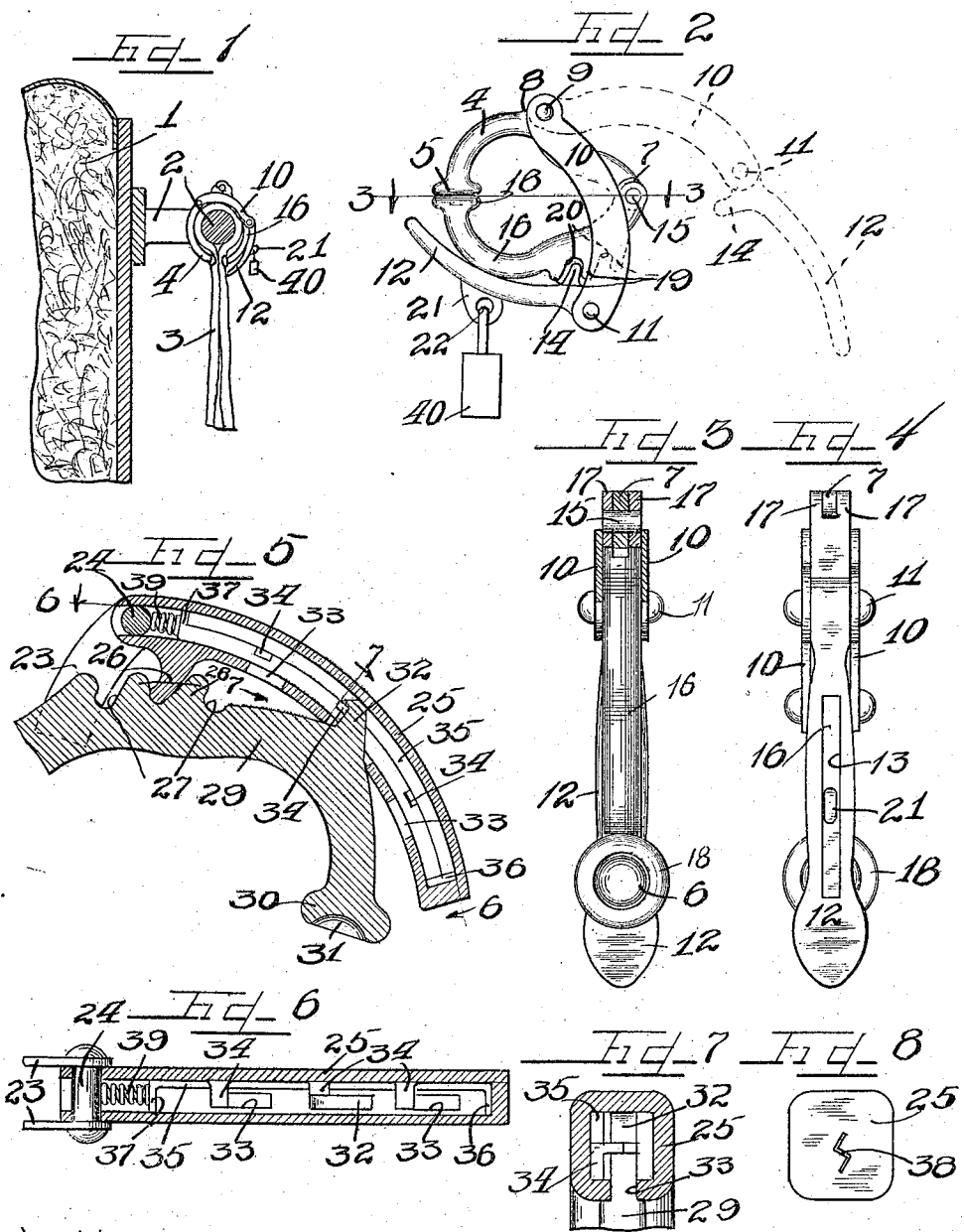

HARRY R. MANSFIELD, OF RACINE, WISCONSIN, ASSIGNOR TO RACINE HANDY MANUFACTURING COMPANY, A CORPORATION OF WISCONSIN.

ROBE-LOCK.

1,300,986.     Specification of Letters Patent.     Patented Apr. 15, 1919.

Application filed July 15, 1916. Serial No. 109,448.

*To all whom it may concern:*

Be it known that I, HARRY R. MANSFIELD, a citizen of the United States, and a resident of the city of Racine, in the county of Racine and State of Wisconsin, have invented certain new and useful Improvements in Robe-Locks; and I do hereby declare that the following is a full, clear, and exact description of the same, reference being had to the accompanying drawings, and to the numerals of reference marked thereon, which form a part of this specification.

In automobile touring and in other modes of traveling there has always been a considerable amount of annoyance caused to travelers by the loss of automobile robes, overcoats, suit cases, grips and the like which are stolen from the traveling conveyances.

This invention relates to improvements in a lock, manacle or shackle in which gripping members or clamping arms are pivoted together and adapted to engage an automobile robe, coat, grip handle, or the like, to lock the same by means of an auxiliary lock to a robe rail or other suitable fixture of a traveling conveyance to prevent such articles from being stolen when left unguarded by their owner.

It is an object of this invention to construct a robe lock comprising pivotally connected gripping members adapted to be locked together by means of linked lever arms, one of which is slotted to permit an apertured tongue integral with one of said members to project therethrough to receive an auxiliary lock to hold said members in locked relation.

It is also an object of this invention to construct a lock comprising a plurality of pivotally connected members adapted to engage an article to affix the same to a support to prevent the article from being stolen.

It is a further object of this invention to construct a linked manacle for automobile robes, grips or other articles to clamp the same to the body of an automobile to prevent said articles from being stolen.

It is an important object of this invention to construct a clamping shackle comprising pivotally connected jaws adapted to be locked on an article by means of levers constructed to permit said jaws to interfit therewith, one of said jaws having an apertured tongue thereon adapted to receive an auxiliary lock to lock said jaws and levers in clamped position on said article to prevent theft thereof.

It is furthermore an object of this invention to construct a lock comprising pivotally connected clamping jaws, having pivotally connected locking levers associated therewith to lock said jaws upon an article and to a structure to prevent theft of the article.

It is finally an object of this invention to construct a lock for automobile robes, suit cases, and the like, said lock comprising a plurality of pivotally connected interfitting members adapted to grip an article and receive an auxiliary lock to hold said members in engagement with said article for locking the same to a suitable means to prevent theft of the article.

The invention (in a preferred form) is illustrated in the drawings and hereinafter more fully described.

In the drawings:

Figure 1 is a fragmentary section through the back of the front seat of an automobile, showing a device embodying the principles of my invention used for locking a robe to the robe rail.

Fig. 2 is a side elevational view of the device in locked position, showing part of the operation in dotted lines.

Fig. 3 is a section taken on line 3—3 of Fig. 2.

Fig. 4 is a bottom plan view of the device as shown in Fig. 2.

Fig. 5 is an enlarged fragmentary sectional view of a modified form of the device.

Fig. 6 is a section taken on line 6—6 of Fig. 5.

Fig. 7 is a section taken on line 7, of Fig. 5.

Fig. 8 is an end view of the locking lever.

As shown in the drawings:

The back of a front seat of an automobile is represented by the reference numeral 1, and rigidly secured on the rear surface of said back is a robe rail 2, over which is hung a robe 3, locked thereon by means of a robe lock embodying the principles of this invention. Said robe lock, manacle or shackle is preferably made of metal and comprises an arched clamp, jaw or arm 4, curved downwardly at each end, the outer end enlarged to form a circular head or lip 5, having a recess 6, therein, while the inner end of said jaw 4, is of reduced thickness to afford an apertured attaching lug 7. Integrally formed on the upper central arched portion of the jaw 4, is a hump 8, having an aperture therein adapted to receive a rivet or bolt 9, for pivotally connecting the ends of two arched plates or links 10, thereon, one on each side of said jaw 4. The opposite ends of said plates 10, are secured together and spaced from one another by a rivet or bolt 11, on which is pivotally mounted, between said plates, a curved handle or lever arm 12, having a long longitudinal slot 13, therein, and having integrally formed on the inner surface near the pivoted end thereof, a curved projection 14.

Pivotally connected to the lug 7, of the jaw 4, by means of a rivet 15, is a second or lower arched clamp, jaw or arm 16, the inner end of which is curved and bifurcated or yoked to form integral ears 17, one disposed on each side of said lug 7, and having apertures, therein to receive said rivet 15, the ends of which are flush with the outer surfaces of said ears. Integrally formed on the outer end of said jaw 16, is a circular head or lip 18, similar to the head 5, and having a recess, similar to recess 6, in the end thereof. Formed on the outer edge and near the inner end of the jaw 16, are a plurality of forwardly curved teeth 19, affording notches 20, therebetween, and also integrally formed on the outer edge and near the forward or outer end of said jaw 16, is a flat rearwardly directed tongue 21, having an aperture 22, therein near the outer end thereof.

In the modified form of the device shown in Figs. 5 to 8, inclusive, the construction is similar to that already described. One of the clamping jaws, not shown, has pivotally connected on either side and between the ends thereof arched plates or links 23, the outer ends of which are apertured to receive a rivet or bolt 24, on which is pivotally mounted between the plates 23, a curved hollow handle or lever arm 25, having a curved projection 26, integrally formed on the lower outer surface near the pivoted end thereof adapted to engage in notches 27, formed by curved teeth 28, integral with the upper portion of an arched clamping jaw 29, which is pivoted on the inner end of the other clamping jaw not shown. The outer end of said jaw 29, has a circular head or lip 30, integrally formed thereon, having a recess 31, in the end thereof. Also integrally formed on the upper or outer portion of the jaw 29, between the head 30 and the teeth 28, is a hooked latch-bolt 32, the head of which is adapted to project through any one of a plurality of apertures 33, cut or formed in the lower wall of said lever arm 25, and lockingly engage over one of a series of finger pieces 34, integrally formed and equidistantly spaced from one another on an arc-shaped locking bar 35, slidably disposed within said hollow lever arm 25. The ends of said bar 35, are bent over at right angles to form flanges or end pieces 36 and 37. Said flange 36, is normally adapted to press against the outer end wall of the lever arm 25, said wall having a key hole 38, therein adapted to receive a key to move said locking bar 35, against the action of a spring 39, mounted in said lever arm, between the flange 37, and the rivet 24, to release the latch-bolt from locking engagement with one of the finger pieces 34, to permit said lever arm 25, to swing out of engagement with the clamping jaw 29.

The operation is as follows:

When it is desired to lock a robe 3, within an automobile, the robe is folded in any suitable manner and placed over the robe rail 2, as shown in Fig. 1. The lever arm 12, and the plates 10, to which it is pivoted, are moved into the position shown in dotted lines in Fig. 2, and the jaws 4 and 16, may then be swung apart about the rivet pin 15. The lock may now be engaged over the robe 3, and the robe rail 2, the jaws 4 and 16, being disposed around the rail and clamping the robe between the heads 5 and 8, and owing to the thickness of the robe this forces a portion of the robe into the recesses in the ends of said heads to afford a firm grip. The plates 10, mounted on either side of the jaw 4, and which together act as a connecting link for the lever arm 12, are now pivotally moved on the rivet 9, to a position permitting the pivoted ends of the jaws 4 and 16, to project between the plates 10. The lever arm 12, is now pivoted on the rivet 11, until the projection 14, engages in one of the notches 20, formed by the teeth 19, further movement of the arm 12, toward the jaw 16, forcing the projection against one of the teeth 19, to tightly clamp the jaws of the lock together over the robe and rail, the tongue 21, projecting through the slot 13, in said lever arm, to permit a pad-lock 40, of any desired type to be engaged in the aperture 22, to lock said robe lock in position and prevent theft of the robe. To unlock the device, it is merely necessary to remove the pad-lock 40, and swing the lever arm 12, and the link plates 10, away from the jaws 4 and 16, into a position as shown in dotted lines in Fig. 2. The jaws may then be pulled apart and the robe lock removed from its engagement with the robe 3, and the rail 2.

In the operation of the modified form of the device shown in Figs. 5 to 8, inclusive, the lever arm 25, is self locking. When the jaws of the robe are locked to clamp a robe on a rail or other suitable fixture, the link plates 23, are moved into a position with the pivoted ends of the locking jaws projecting between said plates. The lever arm 25, is then moved toward the jaw 29, the projection 26, engaging in one of the notches 27 to force the jaws together to clamp the robe, with the hooked latch bolt 32, projecting through one of the apertures 33, and lockingly engaging over one of the finger pieces 34, of the locking bar 35, which is held locked with the latch bolt under the stress of the spring 39. To release the robe lock a key, of uncommon shape is inserted into the key hole, 38, which is also irregular in shape to receive said key. The key is forced inwardly against the flange 36, of the locking bar 25, which is pushed against the action of the spring 39, thus permitting the finger piece 34, to be disengaged from the latch bolt 32, to allow the lever arm 25, and the link plates 29, to swing out of engagement with the clamping jaws of the device, which may be pulled apart to release the robe or other article to which it was attached.

It will of course be understood that the device may be used to lock any kind of an article capable of being engaged by the clamping jaws of the lock, to any suitable fixture of an automobile, or other conveyance, or to a fixture or part of any stationary object, to prevent the particular article from being stolen.

I am aware that various details of construction may be varied through a wide range without departing from the principles of this invention, and I therefore do not purpose limiting the patent granted otherwise than necessitated by the prior art.

I claim as my invention:

1. In a robe lock of the class described pivotally connected clamping members, a slotted handle pivotally connected to one of said members and adapted to engage the other of said members to force the same together into locking position, a member on one of said clamping members adapted to project through the slotted handle and a locking member in the handle adapted to engage said member.

2. In a device of the class described, clamping jaws, pivotally connected members connected therewith adapted to be folded around said jaws to force the same together, a latch bolt secured to one jaw and a spring pressed locking bar in one of said members adapted to engage said latch bolt.

3. In a device of the class described, pivoted clamping members, a lever arm, links pivotally connecting the same to one of said members, a projection integrally formed on said lever arm, teeth formed on the other of said members each adapted to be engaged by the projection, said lever arm adapted to be moved toward said last mentioned member to permit said projection to engage one of said teeth to force said members together into locking position.

4. In a device of the class described, a pair of clamping jaws pivoted together at one end, a pair of links pivoted to one jaw, a plurality of teeth formed on the other jaw, a handle pivoted between said links, a member thereon adjacent the pivotal joint adapted to engage between any of said teeth, and locking mechanism for automatically locking the handle to one of said jaws when the handle is folded against the jaw adapted to prevent unauthorized opening of the handle and jaws.

5. In a robe lock, a pair of clamping jaws pivoted together at one end, a pair of links pivoted to one jaw and extending below the other jaw, a handle pivoted to said links having slots therein, a plurality of teeth on one jaw, a projection on the handle adapted to engage any of said teeth to clamp the jaws together and a hooked member rigidly secured to one jaw adapted to project through one of the slots in the handle when the jaws are clamped together and means for locking the member to said handle.

6. A shackle comprising pivotally connected clamping jaws and a locking lever, said jaws and said lever having different pivotal points, means on said lever for forcing the jaws closed and means in the lever for locking the jaws in the closed position.

7. In a lock of the class described, a clamping jaw, a head integrally formed on the outer end thereof, members pivotally mounted on said jaw, a slotted lever arm pivotally connected to said members, a projection formed thereon, a second clamping jaw pivoted on said first mentioned jaw, a head integrally formed on the outer end thereof, means integrally formed on said second mentioned jaw adapted to be engaged by said projection on the arm to clamp said heads together, and a tongue integral with the second jaw adapted to project through the slot in the arm.

8. A locking device for robes comprising pivotally connected locking members having enlarged recessed heads, a lever pivotally connected with said members, co-acting means on one of said members, a lever for forcing the heads together, and interlocking means on the lever and on said member.

In testimony whereof I have hereunto subscribed my name in the presence of two subscribing witnesses.

HARRY R. MANSFIELD.

Witnesses:
WILLIAM H. F. WARD,
ERNEST LEE PARKER.